(12) United States Patent
Schwartz et al.

(10) Patent No.: US 11,699,172 B2
(45) Date of Patent: **\*Jul. 11, 2023**

(54) SYSTEM AND METHOD FOR DATA ENRICHMENT FOR REQUESTS FOR ADVERTISING ON MOBILE DEVICES

(71) Applicant: Zeta Global Corp., New York, NY (US)

(72) Inventors: Howie Schwartz, Westport, CT (US); Keith Petri, Tenafly, NJ (US)

(73) Assignee: Zeta Global Corp., New York, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/745,302

(22) Filed: May 16, 2022

(65) Prior Publication Data

US 2022/0277350 A1    Sep. 1, 2022

Related U.S. Application Data

(63) Continuation of application No. 15/059,645, filed on Mar. 3, 2016, now Pat. No. 11,373,212.

(60) Provisional application No. 62/127,747, filed on Mar. 3, 2015.

(51) Int. Cl.
*G06Q 30/02* (2023.01)
*G06Q 30/0251* (2023.01)
*G06Q 30/0241* (2023.01)

(52) U.S. Cl.
CPC ..... *G06Q 30/0269* (2013.01); *G06Q 30/0267* (2013.01); *G06Q 30/0277* (2013.01)

(58) Field of Classification Search
None
See application file for complete search history.

(56) References Cited

U.S. PATENT DOCUMENTS

| | | |
|---|---|---|
| 2002/0111172 A1 | 8/2002 | Dewolf et al. |
| 2002/0194215 A1 | 12/2002 | Cantrell et al. |
| 2003/0028451 A1 | 2/2003 | Ananian |
| 2007/0088609 A1 | 4/2007 | Reller et al. |
| 2007/0088851 A1 | 4/2007 | Levkovitz et al. |
| 2008/0288350 A1 | 11/2008 | Iris et al. |
| 2008/0301727 A1 | 12/2008 | Cristofalo et al. |
| 2011/0111738 A1 | 5/2011 | Jones et al. |
| 2011/0238496 A1 | 9/2011 | Gurbuxani et al. |

(Continued)

OTHER PUBLICATIONS

"U.S. Appl. No. 15/059,645, Final Office Action dated May 16, 2019", 51 pgs.

(Continued)

*Primary Examiner* — Vincent M Cao
(74) *Attorney, Agent, or Firm* — Schwegman Lundber & Woessner, P.A.

(57) ABSTRACT

A data enrichment system for enriching requests for advertising opportunities. The data enrichment system is configured to aggregate and index data to provide end user insights to marketers based upon information supplied by publishers in regards to advertising opportunities passed along in requests. The system is configured to take attributes passed along in a request associated with the advertising opportunity and provide enriched data based upon the attributes received in the request. The attributes can then identify corresponding enriched data that can be passed along to the marketers.

14 Claims, 8 Drawing Sheets

(56) References Cited

U.S. PATENT DOCUMENTS

| | | |
|---|---|---|
| 2011/0288932 A1 | 11/2011 | Marks et al. |
| 2014/0019456 A1* | 1/2014 | Li .................. G06F 16/9535 707/741 |
| 2014/0222589 A1 | 8/2014 | Chatter et al. |
| 2014/0325055 A1 | 10/2014 | Oh et al. |
| 2016/0086215 A1 | 3/2016 | Wang et al. |
| 2016/0260136 A1 | 9/2016 | Schwartz et al. |

OTHER PUBLICATIONS

"U.S. Appl. No. 15/059,645, Final Office Action dated Jul. 12, 2021", 56 pgs.

"U.S. Appl. No. 15/059,645, Final Office Action dated Jul. 20, 2020", 52 pgs.

"U.S. Appl. No. 15/059,645, Non Final Office Action dated Jan. 9, 2020", 53 pgs.

"U.S. Appl. No. 15/059,645, Non Final Office Action dated Sep. 7, 2018", 44 pgs.

"U.S. Appl. No. 15/059,645, Non Final Office Action dated Nov. 10, 2021", 58 pgs.

"U.S. Appl. No. 15/059,645, Non Final Office Action dated Nov. 27, 2020", 53 pgs.

"U.S. Appl. No. 15/059,645, Notice of Allowance dated Mar. 14, 2022", 10 pgs.

"U.S. Appl. No. 15/059,645, Response filed Feb. 9, 2022 to Non Final Office Action dated Nov. 10, 2021", 12 pgs.

"U.S. Appl. No. 15/059,645, Response filed Mar. 7, 2019 to Non Final Office Action dated Sep. 7, 2018", 17 pgs.

"U.S. Appl. No. 15/059,645, Response filed May 11, 2020 to Non Final Office Action dated Jan. 9, 2020", 10 pgs.

"U.S. Appl. No. 15/059,645, Response filed Oct. 12, 2021 to Final Office Action dated Jul. 12, 2021", 9 pgs.

"U.S. Appl. No. 15/059,645, Response filed Oct. 20, 2020 to Final Office Action dated Jul. 20, 2020", 10 pgs.

"U.S. Appl. No. 15/059,645, Response filed Nov. 18, 2019 to Final Office Action dated May 16, 2019", 24 pgs.

"U.S. Appl. No. 15/059,645, Response filed Apr. 27, 2021 to Non Final Office Action dated Nov. 27, 2020", 10 pgs.

* cited by examiner

SYSTEM AND METHOD FOR DATA ENRICHMENT FOR REQUESTS FOR ADVERTISING ON MOBILE DEVICES

CLAIM OF PRIORITY

The present application is a continuation of U.S. patent application Ser. No. 15/059,645, filed Mar. 3, 2016, which application claims priority from Provisional Patent Application No. 62/127,747, filed on Mar. 3, 2015, the disclosures of which are relied upon and incorporated herein by reference.

BACKGROUND OF THE INVENTION

Technical Field

The present invention is in the technical field of mobile advertising. In particular, some embodiments of the present invention relate to system and methods to facilitate audience insights for mobile advertisements, including mobile phones and tablets.

Related Art

Mobile advertising technology is continuously improving and consumer adoption of mobile technology is quickly dwarfing traditional desktop and feature phone sales. The ever-changing landscape is a result of consistent improvements to hardware and software, fragmented components and multiple operating systems (OS) available in the market, updates to wireless infrastructure, shifts in industry regulation, and consumer privacy concerns as a result of a lag in market education on the innovations aforementioned. This has resulted in niche solutions to target users on mobile devices: retargeting, bid request data, and device ID profiles. However, these three leading targeting methodologies all present limitations.

Retargeting has been a proven method to move a consumer further down the conversion funnel in the desktop realm. However, retargeting requests require that a user have already visited the website previously. While easy to implement in a desktop environment, with a known location and cookies assisting, this requirement hurts the ability to extend a mobile publisher's audience to new visitors.

Bid Request Data has been effective to pass along small amounts of data from publishers in real-time in bid requests. However, the data is limited to information of the user agent, which includes the mobile device type and operating system, the location of the user, and the advertisement opportunity path. Such limited information leads marketers to make assumptions based on simple intuition (e.g., owners of HTC GE are wealthy due to the cost of the hardware; a user running a device with Android v2.0 has lower household income than an iOS v4.0 user, etc.). However, with the proliferation of software versions and hardware, inaccuracies run abound in making such assumptions on such little information.

Mobile data companies are quickly scaling, building historical usage and performance profiles from various datasets focused on personally identifiable information (PPI) and associating the user's activities with a static identifier. i.e., device ID profiles. However, when the average DSP is provided with a list of Device IDs to target from a mobile DMP the typical match rate falls shy of 20%-leaving 80% of an advertisers potential audience behind. In addition, there is also the public concern of using PPI and the negative associated with such a use.

Therefore, there is a need for a system and method to enrich bid data to provide marketers with more information about the end user while addressing privacy concerns of the users.

SUMMARY OF INVENTION

The present invention is a system and method for enriching data that comes from a request associated with advertising opportunities. In an aspect, the system is a data enrichment system that is configured to aggregate and index data to provide end user insights to marketers based upon information supplied by publishers in regards to advertising opportunities passed along in requests.

In an aspect, the system is configured to take attributes (e.g., quality or feature) passed along in a request associated with the advertising opportunity and provide enriched data based upon the attributes received in the request. The attributes can then identify corresponding enriched data that can be passed along to the marketers. The marketers can then use the enriched data in order to submit responses to the requests, if any requests are submitted.

In an aspect, the data enrichment system is configured to use a number of attributes, including, but not limited to, publisher attributes and location attributes. In an aspect, the data enrichment system is configured to enrich the request based upon the publisher attributes by adding publisher related datasets related to the publisher attributes. The publisher related datasets are related to information indicated by the publisher attributes. In an aspect, the data enrichment system is configured to utilize user agent attributes by enriching the request by adding user agent related datasets related to the user agent attributes. In an aspect, the publisher related and user agent related datasets include audience demographic data. In an aspect, the publisher related and user agent related datasets are collected and formulated by the data enrichment system from publicly available information.

In an aspect, the data enrichment system is configured to enrich the request based upon the location attributes by adding location related datasets related to the location related attributes. In an aspect, the location related datasets include point of interest data, spatial data, and census/economic data. In an aspect, the location related datasets are collected and formulated by the data enrichment system from publicly available information.

These and other objects and advantages of the invention will become apparent from the following detailed description of the preferred embodiment of the invention.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

DETAILED DESCRIPTION OF THE EMBODIMENTS

Figure 1:
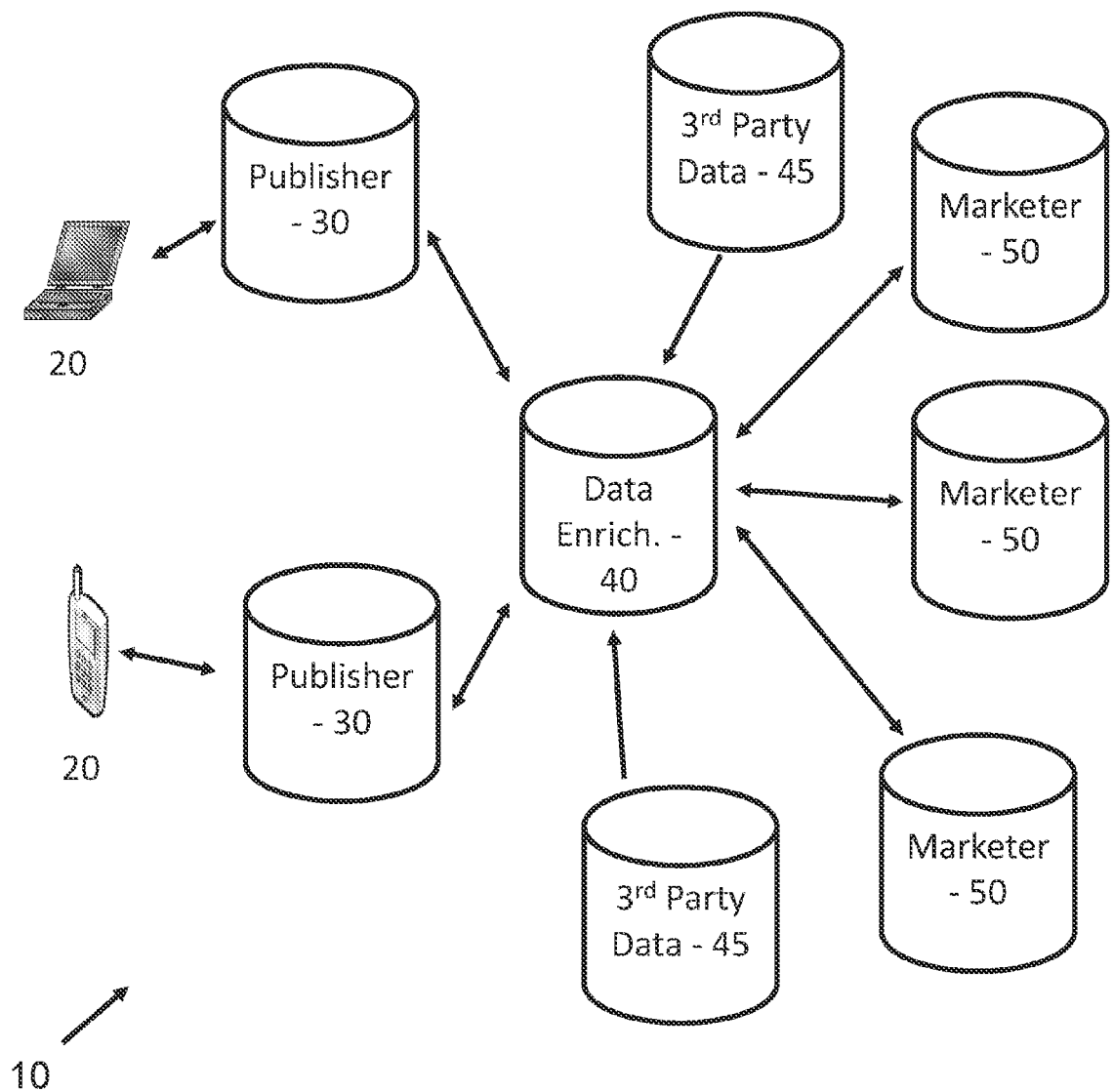
FIG. 1 is a schematic representation of a data enrichment system according to an aspect.

The present invention will now be described more fully hereinafter with reference to the accompanying drawings, which are intended to be read in conjunction with this detailed description, the summary, and any preferred and/or particular embodiments specifically discussed or otherwise disclosed. This invention may, however, be embodied in many different forms and should not be construed as limited to the embodiments set forth herein. Instead, these embodiments are provided by way of illustration only and so that this disclosure will be thorough, complete and will fully convey the full scope of the invention to those skilled in the art.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

"Advertisements" means content and promotional material for one or more brands, products and/or services in any form or format. This includes, but is not limited to, audio, badges, banners, buttons, interstitials, text hyperlinks, and video advertisements.

"Applications" means computer applications that may serve Advertisements to End Users, including but not limited to mobile applications.

"Bid" means a real-time bid by Advertiser for Inventory.

"CPM" means cost-per-thousand Advertisement impressions or requests.

"Data" means any and all data and other information directly or indirectly available to, provided or collected or processed through or generated, including any and all input, output and usage data, of any nature and format.

"End User" means any individual who is the end user that views or listens to, is able to view or listen to, or interacts with an Advertisement.

"Inventory" means the Inventory for Advertisements made available to Advertiser and others for purchase by real-time bidding and/or fixed prices, including Mobile Inventory.

"Mobile Inventory" means the Inventory for Advertisements for delivery to mobile devices for purchase in real-time bidding in Auctions and/or for static purchases at fixed prices. Sources of Inventory include, but are not limited to, mobile exchanges and/or mobile networks, and or direct publisher sites or Apps.

"Winning Bid" means the Bid selected as the winner for a particular Auction.

"Winning Bid Price" means the price contained in the Bid selected as the winner for a particular Auction.

"Winning Bidder" means the party who placed the Winning Bid for a particular Auction.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. In addition, the present methods and systems may be implemented by centrally located servers, remote located servers, or cloud services. Any suitable computer-readable storage medium may be utilized including hard disks, CD-ROMs, optical storage devices, or magnetic storage devices. In an aspect, the methods and systems discussed below can take the form of function specific machines, computers, and/or computer program instructions.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a special purpose computer, computers and components found in cloud services, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems that have been introduced above, and discussed in further detail below, have been and will be described as comprised of units. One skilled in the art will appreciate that this is a functional description and that the respective functions can be performed by software, hardware, or a combination of software and hardware. A unit can be software, hardware, or a combination of software and hardware. In one exemplary aspect, the units can comprise a computer. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

FIG. 1 illustrates a data enrichment system 10 according to an aspect of the present invention. The data enrichment system 10 includes a plurality of internet enabled devices 20 that are configured for use by various different users. The internet enabled devices 20 can communicate with various publisher servers 30, which provide content for the internet enabled devices 20. The content can include advertisements that are presented on applications found on the internet enabled devices 20, discussed in detail below. The publisher servers 30 present advertisement opportunities via requests to marketer servers 50 via the data enrichment server 40. The marketer servers 50 can provide the advertisements for the publisher servers 30 for a cost. The publisher servers 30, based upon attributes from the internet enabled device 20, call upon the data enrichment server 40 to enrich the requests to pass along the advertisement opportunities to the marketer servers 50. The data enrichment server 40 can add enriched data to the request through datasets. In an aspect, the data enrichment server 40 can formulate the datasets from information provided by third party data servers 45. The marketer servers 50 receive the enriched requests, and can then make the determination as to whether or not to answer the advertisement request, and how to answer the advertisement request.

Figure 2:
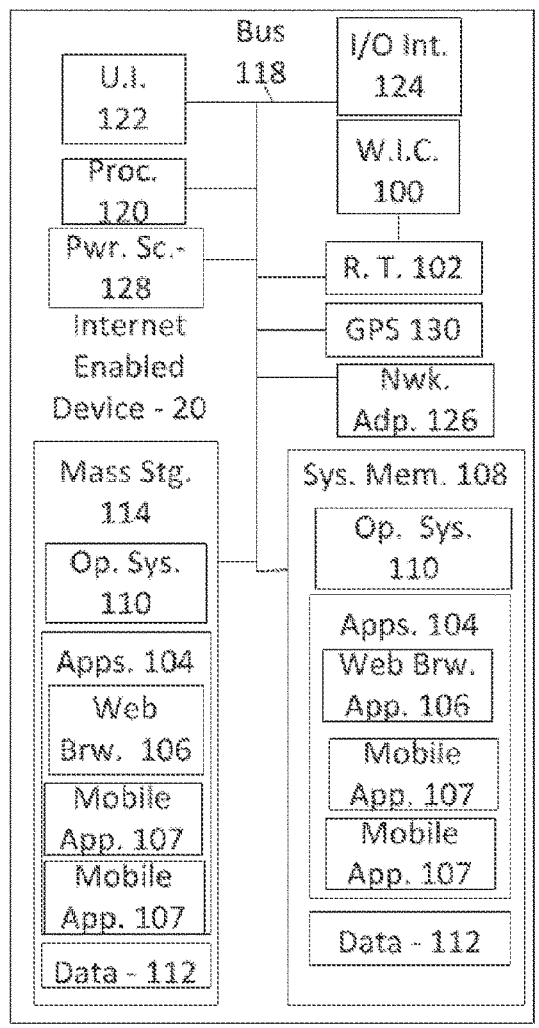
FIG. 2 is a block diagram of an internet enabled device of the system of FIG. 1 according to an aspect.

The internet enabled devices 20 can include, but are not limited to, laptop computers, tablets, smart phones, PDA's, hand held computers, wearable computers, and the like. While the internet enabled devices 20 can include various types of devices, the data enrichment system 10 is configured to assist with enriching data for mobile internet enabled devices 20. As shown in FIG. 2, the internet enable devices 20 include a combination wireless interface controller 100 and radio transceiver 102. The wireless interface controller (W.I.C.) 100 is configured to control the operation of the radio transceiver (R.T.) 102, including the connections of the radio transceiver 102, as well as the receipt and transfer of information from and to the publisher servers 30, data enrichment server 40, and marketing server 50.

The radio transceiver 102 may communicate on a wide range of public frequencies, including, but not limited to, frequency bands 2.4 GHz and/or 5 GHz-5.8 GHz. In addition, the radio transceiver 102, with the assistance of the wireless interface controller 100, may also utilize a variety of public protocols. For example, in some embodiments of the present invention, the combination wireless interface controller 100 and radio transceiver 102 may operate on various existing and proposed IEEE wireless protocols, including, but not limited to, IEEE 802.11b/g/n/a/ac, with maximum theoretical data transfer rates/throughput of 11 Mbps/54 Mbps/600 Mbps/54 MBps/1 GBps respectively. In an aspect, the radio transceiver 102 can include a wireless cellular modem 102 configured to communicate on cellular networks. The cellular networks can include, but are not limited to, GPRS, GSM, UMTS, EDGE, HSPA, CDMA2000, EVDO Rev 0, EVDO Rev A, HSPA+, and WiMAX, LTE.

In an aspect, the internet enabled devices 20 are configured to communicate with other devices over various networks. The internet enabled devices 20 can operate in a networked environment using logical connections, including, but not limited to, local area network (LAN) and a general wide area network (WAN), and the Internet. Such network connections can be through a network adapter (Nwk. Adp.) 126. A network adapter 126 can be implemented in both wired and wireless environments. Such networking environments are conventional and commonplace in offices, enterprise-wide computer networks, intranets, cellular networks and the Internet.

The internet enable devices 20 may have one or more software applications 104, including a web browser application 106 and various mobile applications 107. The internet enabled device 20 includes system memory 108, which can store the various applications 104, including the web browser application 106 and mobile applications 107, as well as the operating system 110. The system memory 108 may also include data 112 accessible by the various software applications 104. The system memory 108 can include random access memory (RAM) or read only memory (ROM). Data 112 stored on the internet enabled device 20 may be any type of retrievable data. The data may be stored in a wide variety of databases, including relational databases, including, but not limited to, Microsoft Access and SQL Server, MySQL, INGRES, DB2, INFORMIX, Oracle, PostgreSQL, Sybase 11, Linux data storage means, and the like.

The internet enabled device 20 can include a variety of other computer readable media, including a storage device 114. The storage device 114 can be used for storing computer code, computer readable instructions, program modules, and other data 112 for the internet enabled device 20, and can be used to back up or alternatively to run the operating system 110 and/or other applications 104, including the web browser application 106 and mobile applications 107. The storage device 114 may include a hard disk, various magnetic storage devices such as magnetic cassettes or disks, solid-state flash drives, or other optical storage, random access memories, and the like.

The internet enabled device 20 may include a system bus 118 that connects various components of the internet enabled device 20 to the system memory 108 and to the storage device 114, as well as to each other. Other components of the internet enabled device 20 may include one or more processors or processing units 120, a user interface 122, and one or more input/output interfaces 124. A user can interact with the internet enabled devices 20 through one or more input devices (not shown), which include, but are not limited to, a keyboard, a mouse, a touch-screen, a microphone, a scanner, a joystick, and the like, via the user interface 122.

In addition, the internet enabled device 20 includes a power source 128, including, but not limited to, a battery or an external power source. In an aspect, the internet enabled device 20 can also include a global positioning system (GPS) chip 130, which can be configured to find the location of the internet enabled device 20. The GPS chip 130 can be configured to identify the location of the internet enabled device 20 using longitude and latitude coordinates.

Figure 3:
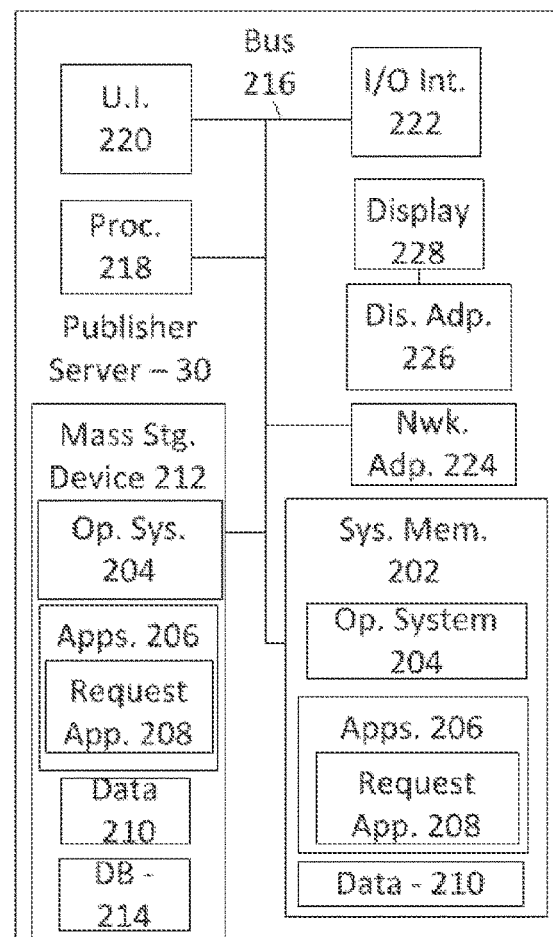
FIG. 3 is a block diagram of a publisher server of FIG. 1 according to an aspect.

As shown in FIG. 1, the data enrichment system 10 can include a plurality of publisher servers 30. FIG. 3 illustrates a publisher server 30 according to an aspect. The publisher server 30 may have several applications 206, discussed in more detail below. In general, the publisher server 30 applications 206 may utilize elements and/or modules of several nodes or servers. In any event, the publisher servers 30 should be construed as inclusive of multiple modules, software applications, servers and other components that are separate from the internet enabled devices 20, data enrichment server 40, marketing servers 50, and in some cases, third party servers 45.

The publisher servers 30 can include system memory 202, which stores the operating system 204 and various software applications 206, including a request application 208. The publisher servers 30 may also include data 210 that is accessible by the software applications 206. The publisher servers 30 may include a mass storage device 212. The mass storage device 212 can be used for storing computer code, computer readable instructions, program modules, various databases 214, and other data for the publisher servers 30. The mass storage device 212 can be used to back up or alternatively to run the operating system 204 and/or other software applications 206. The mass storage device 212 may include a hard disk, various magnetic storage devices such as magnetic cassettes or disks, solid state-flash drives, CD-ROM, DVDs or other optical storage, random access memories, and the like.

The publisher servers 30 may include a system bus 216 that connects various components of the publisher servers 30 to the system memory 202 and to the mass storage device 212, as well as to each other. In an aspect, the mass storage device 212 can be found on the same publisher server 30. In another aspect, the mass storage device 212 can comprise multiple mass storage devices 212 that are found separate from the publisher server 30. However, in such aspects the publisher servers 30 can be provided access.

Other components of the publisher servers 30 may include one or more processors or processing units 218, a user interface 220, an input/output interface 222, and a network adapter 224 that is configured to communicate with other devices, including internet enabled devices 20, data enrichment servers 40, marketer servers 50, third party servers 45, and the like. The network adapter 224 can communicate over various networks. In addition, the publisher servers 30 may include a display adapter 226 that communicates with a display device 228, such as a computer monitor and other devices that present images and text in various formats. A system administrator can interact with the publisher servers 30 through one or more input devices (not shown), which include, but are not limited to, a keyboard, a mouse, a touch-screen, a microphone, a scanner, a joystick, and the like, via the user interface 220.

Figure 4:
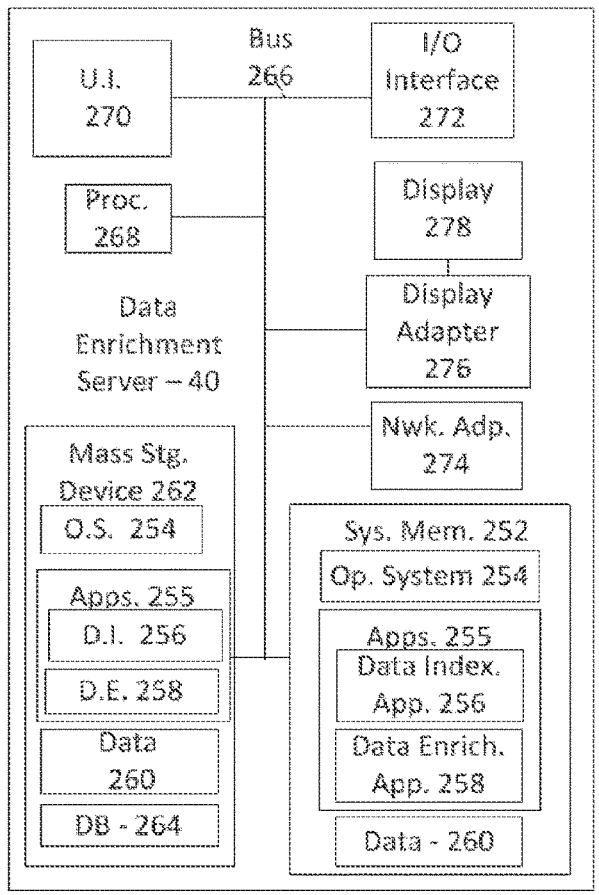
FIG. 4 is a block diagram of a data enrichment server of FIG. 1.

FIG. 4 illustrates a data enrichment server 40 according to an aspect. The data enrichment server 40 may have multiple applications 255, discussed in more detail below. In general, the data enrichment server 40 and its applications 255 may utilize elements and/or modules of several nodes or servers. In any event, the data enrichment server 40 should be construed as inclusive of multiple modules, software applications, servers and other components that are separate from the internet enabled devices 20, publisher servers 30, third party servers 45, and marketer servers 50.

The data enrichment server 40 can include system memory 252, which stores the operating system 254 and various software applications 255, including a data indexing application 256 and a data enrichment application 258. The data enrichment server 40 may also include data 260 that is accessible by the software applications 255. The data enrichment server 40 may include a mass storage device 262. The mass storage device 262 can be used for storing computer code, computer readable instructions, program modules, various databases 264, and other data for the data enrichment server 40. The mass storage device 262 can be used to back up or alternatively to run the operating system 254 and/or other software applications 255. The mass storage device 262 may include a hard disk, various magnetic storage devices such as magnetic cassettes or disks, solid state-flash drives, CD-ROM, DVDs or other optical storage, random access memories, and the like.

The data enrichment server 40 may include a system bus 266 that connects various components of the data enrichment server 40 to the system memory 252 and to the mass storage device 262, as well as to each other. In an aspect, the mass storage device 262 can be found on the same data enrichment server 40. In another aspect, the mass storage device 262 can comprise multiple mass storage devices 262 that are found separate from the data enrichment server 40. However, in such aspects the data enrichment server 40 can be provided access.

Other components of the data enrichment server 40 may include one or more processors or processing units 268, a user interface 270, an input/output interface 272, and a network adapter 274 that is configured to communicate with other devices, including, but not limited to, internet enabled devices 20, publisher servers 30, third party servers 45, marketer servers 50, and the like. The network adapter 274 can communicate over various networks. In addition, the data enrichment server 40 may include a display adapter 276 that communicates with a display device 278, such as a computer monitor and other devices that present images and text in various formats. A system administrator can interact with the data enrichment server 40 through one or more input devices (not shown), which include, but are not limited to, a keyboard, a mouse, a touch-screen, a microphone, a scanner, a joystick, and the like, via the user interface 270.

Figure 5:
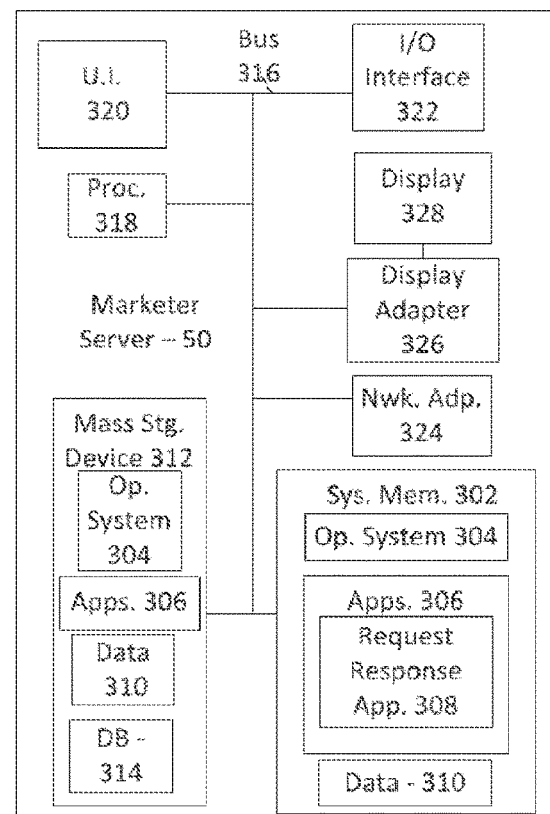
FIG. 5 is a block diagram of a marketer server of FIG. 1.

FIG. 5 illustrates a marketer server 50 according to an aspect. The marketer server 50 may have multiple applications 306, discussed in more detail below. In general, the marketer server 50 and its applications 306 may utilize elements and/or modules of several nodes or servers. In any event, the marketer server 50 should be construed as inclusive of multiple modules, software applications, servers and other components that are separate from the internet enabled devices 20, publisher servers 30, data enrichment server 40, and third party servers 45.

The marketer server 50 can include system memory 302, which stores the operating system 304 and various software applications 306, including a request response application 308. The marketer server 50 may also include data 310 that is accessible by the software applications 306. The marketer server 50 may include a mass storage device 312. The mass storage device 312 can be used for storing computer code, computer readable instructions, program modules, various databases 314, and other data for the marketer server 50. The mass storage device 312 can be used to back up or alternatively to run the operating system 304 and/or other software applications 306. The mass storage device 312 may include a hard disk, various magnetic storage devices such as magnetic cassettes or disks, solid state-flash drives, CD-ROM, DVDs or other optical storage, random access memories, and the like.

The marketer server 50 may include a system bus 316 that connects various components of the marketer server 50 to the system memory 302 and to the mass storage device 312, as well as to each other. In an aspect, the mass storage device 312 can be found on the same marketer server 50. In another aspect, the mass storage device 312 can comprise multiple mass storage devices 312 that are found separate from the marketer server 50. However, in such aspects the marketer server 50 can be provided access.

Other components of the marketer server 50 may include one or more processors or processing units 318, a user interface 320, an input/output interface 322, and a network adapter 324 that is configured to communicate with other devices, including, but not limited to, internet enabled devices 20, publisher servers 30, third party servers 45, and the like. The network adapter 324 can communicate over various networks. In addition, the marketer server 50 may include a display adapter 326 that communicates with a display device 328, such as a computer monitor and other devices that present images and text in various formats. A system administrator can interact with the servers through one or more input devices (not shown), which include, but are not limited to, a keyboard, a mouse, a touch-screen, a microphone, a scanner, a joystick, and the like, via the user interface 320.

The third party servers 45 have many of the same components as discussed above in relation to the publisher servers 30, the data enrichment server 40, and the marketer server 50. However, the third party servers 45 main function in relation to this invention is to provide data at the request of the data enrichment server 40, discussed in more detail below.

Referring back to the data enrichment server 40, the data indexing application 256 and the data enrichment application 258 work together to provide end user insights to the marketers, via the marketer servers 50, for the selection of advertising opportunities. The user insights can be based upon collected, analyzed, and indexed data from information collected from the internet enabled devices 20, the publisher servers 30, third party servers 40, and other data points. In an aspect, the data indexing application 256 is configured to gather and index information, forming datasets, obtained through the publisher servers 30 and third party servers 45, which correspond to attributes passed from the internet enabled devices 20 to the publisher servers 30 that accompany a request. The request is then appended with the indexes/datasets, formed by the data indexing application 256, which correspond to the attributes by the data enrichment application 258. The request response application 310 of the marketer servers 50 can then use this appended information in making an informed decision as to whether to respond to such a request, as well as how to respond.

Figure 6:
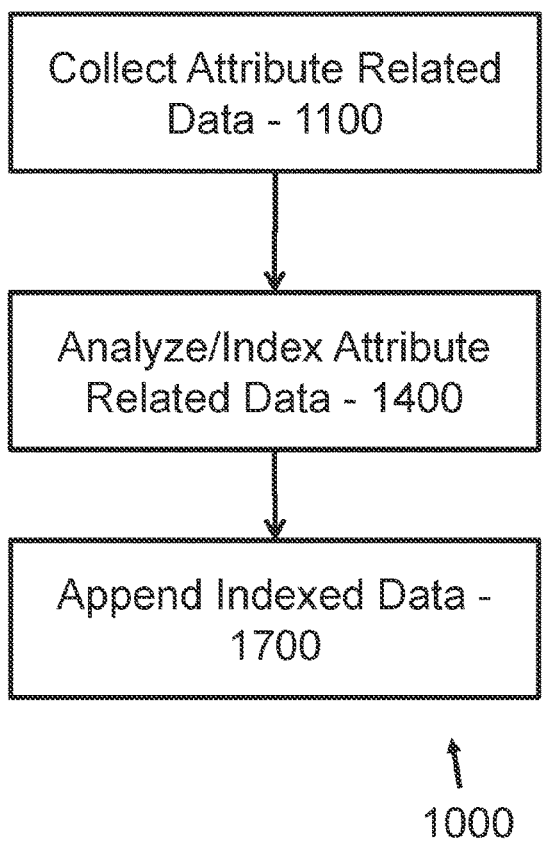
FIGS. 6-12 are flow diagrams of methods performed by the system of FIG. 1.

FIG. 6 illustrates a method 1000 performed by the data enrichment server 40. The data enrichment server 40, through the use of the data indexing application 256 and the data enrichment application 258, is configured to collect attribute related data (step 1100), analyze and index the collected attribute data (step 1400), and append the indexed attribute data/datasets to corresponding attributes in the request (step 1700). In an exemplary aspect, the data indexing application 256 performs the collection, analysis, and indexing (steps 1100 and 1400), and the data enrichment application 258 performs the appending (step 1700).

As shown above, the data collection, analysis, index, and appending is based upon corresponding attributes. The attributes are provided by a combination of the internet enabled devices 20 and the publisher servers 30. In an aspect, the attributes can include, but are not limited to, publisher attributes, user agent attributes, and location attributes. The method (1000) discussed above is performed based upon such attributes provided, and discussed in detail below. These attributes can be passed along to the data enrichment server 40 via a combination of the internet enabled devices 20 and the publisher servers 30.

Figure 7:
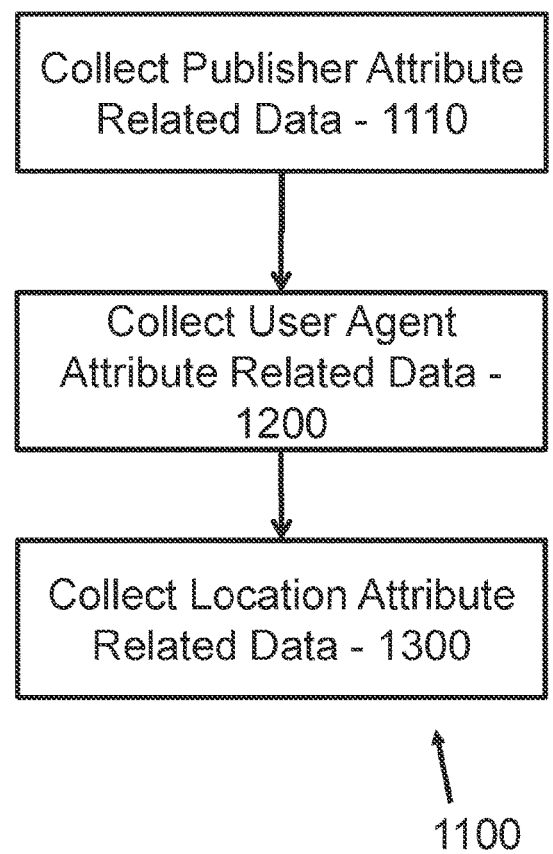

FIG. 7 illustrates an aspect of the collection of attribute related data (step 1100). The data indexing application 256 can be configured to collect information related to the publisher attributes (step 1110), collect information for the user agent attributes (step 1200), and collect information related to the location attributes (step 1300).

Figure 8:
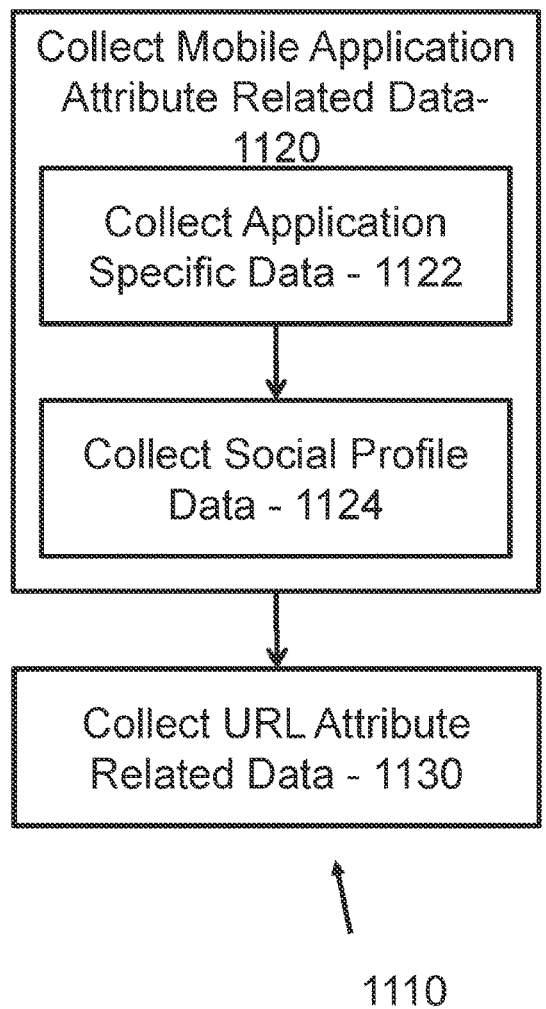

In an aspect, the collecting of information related to the publisher attributes (step 1110) includes collecting data points related to mobile applications (step 1120), as shown in FIG. 8. In an exemplary aspect, the information that is collected is the available information found on mobile application stores. For example, these mobile application stores can include, but are not limited to, iTunes, Google Play, Amazon, Windows Store, and the like. In an aspect, the collecting data points related to the mobile applications includes collecting known information supplied directly by the application stores. In such aspects, the information can come directly from the publisher servers 30 or can be supplied by a third party server 45. In another aspect, the data indexing application 256 can be configured to search mobile application stores for such information. In an aspect, the data indexing application 256 can be configured to scan such mobile application stores for newly available applications that have not yet been identified and reported on by the mobile application stores themselves. In an exemplary aspect, the data indexing application 256 can be configured to collect only data points publicly available, and strictly avoid obtaining personally identifiable information.

In an aspect, collecting data points related to mobile applications (step 1120) includes collecting application specific data points (step 1122) and related social profile data (step 1124). The collecting of application specific data points includes collecting data directed to the application itself. In most cases, application specific data points are supplied directly by the publisher of the application, or can be easily obtained from the mobile application store. Such data points include, but are not limited to, the following data points: App Name; App Category (which can be the category assigned to the application by the application store, and can meet standardize LAB standards); Developer Name; Price Presence; Price Point, Number of Reviews; App Store Rating; Content Age Rating; App Description; Number of Installations of the Application; Release Date; Last Update Date of Application; Featured Rank; Review information, including the Review Name and Text of the Review.

The collecting of related social profile data (step 1124) includes collecting information from social profiles associated with the applications. The social profiles can be found on, but are not limited to, Facebook, Twitter, Google+, YouTube, and public websites. In an aspect, the social data can be collected for any party that has been found associated with the mobile applications. Such social data can be from, but is not limited to, the mobile application developer, the application itself (in the case when an application has social pages or profiles established on their behalf), and individual reviewers. Such information can be used to establish brand affinity, discussed in detail below. In regards to the reviewers' social profiles, the data indexing application 256 can be configured to collect only publicly available information. In addition, the data indexing application 256 can be configured to only obtain the information in aggregate form from a third party server 45, thereby preventing any acquisition of personally identifiable information.

In an aspect, the data indexing application 256 can be further configured to obtain similar information for specific url's (step 1130). For example, the advertising opportunity can be presented on a web browser, and not through a mobile application. In such instances, the data indexing application 256 can collect similar information as discussed above that can be gathered from the url.

The data indexing application 256 can collect information for the user agent attributes (step 1200) by collecting information that is related to the information supplied in the header of a request from a publisher server 30. In an aspect, the header information can be supplied by the internet enabled devices 20. Such information can include, but is not limited to, the application name, browser operator and version, the operating system of the internet enabled device 20 (e.g., iOS, Android, Windows, etc.), as well as the mobile service provider (e.g., Verizon, ATT, T-Mobile, Sprint, etc.). The information associated with the user agent attributes can include demographic information about the users, including, but not limited to, economic information, ethnicity, education level, and the like. As discussed above, such information can be supplied from third party servers 45, and can be passed along without personally identifiable information.

Figure 9:
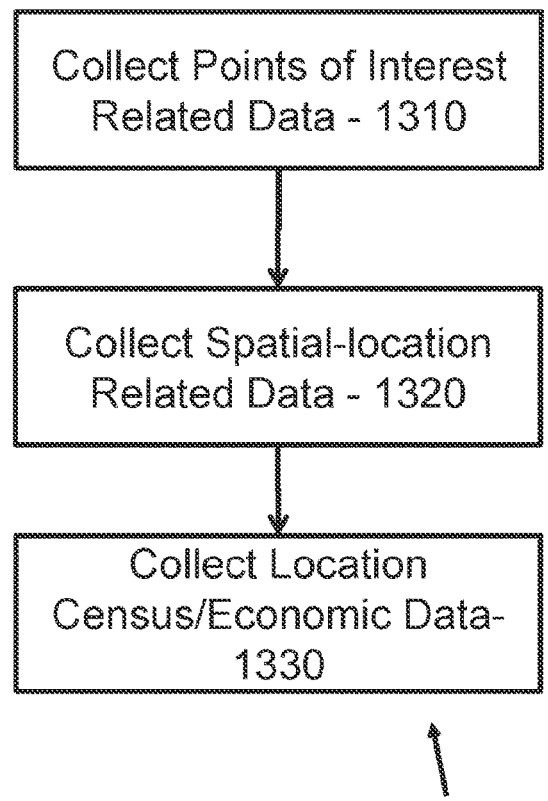

The data indexing application 256 can also be configured to collect information related to the location attributes (step 1300). Such location attributes can include longitude and latitude information, as well as IP addresses from which the internet enabled devices 20 accessed the internet. The collection of information related to location attributes can include collecting point of interest data (step 1310), collecting spatial-location related information (step 1320), and collecting census and economic information (step 1330), as shown in FIG. 9. In an aspect, the collecting of point of interest data (step 1310) is aimed at collecting point of interest data, which can include business information. Such information collected can include, but is not limited to, business name, business address, and the latitude/longitude related to the business. In addition, the business information can include information for a location that is not associated with a business, such as monuments, parks, and the like.

In another aspect, the point of interest data can also include information that states whether a place is more likely to be associated with a work environment, a home environment, a travel environment, or other activity based information. Such information can be based upon whether or not the internet enabled device 20 accesses the internet through an IP address associated with the point of interest, which can indicate whether or not the environment is a work-based environment.

Collecting of spatial-location related information (step 1320) can include collecting information related to the weather at a given location and collecting information related to events at a certain location. When collecting weather related information, the data indexing application 256 can be configured to collect current and forecasted weather conditions. In an exemplary aspect, the conditions, forecasted and current, can be obtained through XML feeds from NOAA. Such weather attributes can include, but are not limited to; Current>Temp min; Current>Temp max; Current>Temp; Forecast>Day 1>Temp min; Forecast>Day 1>Temp max; Current>Condition>Mostly Cloudy; Forecast>Condition>Mostly Cloudy; Current>Condition>Fair; Forecast>Condition>Fair; Current>Condition>Clear; Forecast>Condition>Clear; Current>Condition>A Few Clouds; Forecast>Condition>A Few Clouds; Current>Condition>Partly Cloudy; Forecast>Condition>Partly Cloudy; Current>Condition>Overcast; Forecast>Condition>Overcast; Current>Condition>Fog/Mist; Forecast>Condition>Fog/Mist; Current>Condition>Fog; Forecast>Condition>Fog; Current>Condition>Freezing Fog; Forecast>Condition>Freezing Fog; Current>Condition>Smoke; Forecast>Condition>Smoke; Current>Condition>Freezing Rain; Forecast>Condition>Freezing Rain; Current>Condition>Freezing Drizzle; Forecast>Condition>Freezing Drizzle; Current>Condition>Ice Pellets; Forecast>Condition>Ice Pellets; Current>Condition>Ice Crystals; Forecast>Condition>Ice Crystals; Current>Condition>Hail; Forecast>Condition>Hail; Current>Condition>Hail/Snow Pellets; Forecast>Condition>Hail/Snow Pellets; Current>Condition>Freezing Rain Snow; Forecast>Condition>Freezing Rain Snow; Current>Condition>Freezing Drizzle Snow; Forecast>Condition>Freezing Drizzle Snow; Current>Condition>Rain Ice Pellets; Forecast>Condition>Rain Ice Pellets; Current>Condition>Drizzle Ice Pellets;

Forecast>Condition>Drizzle Ice Pellets; Current>Condition>Rain Snow; Forecast>Condition>Rain Snow; Current>Condition>Drizzle Snow; Forecast>Condition>Drizzle Snow; Current>Condition>Rain Showers; Forecast>Condition>Rain Showers; Current>Condition>Rain Showers Fog/Mist; Forecast>Condition>Rain Showers Fog/Mist; Current>Condition>Thunderstorm; Forecast>Condition>Thunderstorm; Current>Condition>Thunderstorm/Snow Pellets; Forecast>Condition>Thunderstorm/Snow Pellets; Current>Condition>Snow; Forecast>Condition>Snow; Current>Condition>Snow Fog/Mist; Forecast>Condition>Snow Fog/Mist; Current>Condition>Thunderstorm Snow; Current>Condition>Windy; Forecast>Condition>Windy; Current>Condition>Breezy; Forecast>Condition>Breezy; Current>Condition>Overcast and Windy; Forecast>Condition>Overcast and Windy; Current>Condition>Showers; Forecast>Condition>Showers; Current>Condition>Freezing Rain Rain; Forecast>Condition>Freezing Rain Rain; Current>Condition>Freezing Drizzle Rain; Current>Condition>Light Rain; Forecast>Condition>Light Rain; Current>Condition>Drizzle; Forecast>Condition>Drizzle; Current>Condition>Rain; Forecast>Condition>Rain; Current>Condition>Funnel Cloud; Forecast>Condition>Funnel Cloud; Current>Condition>Tornado/Water Spout; Forecast>Condition>Tornado/Water Spout; Current>Condition>Dust; Forecast>Condition>Dust; Current>Condition>Sand; Forecast>Condition>Sand; Current>Condition>Dust/Sand Whirls; Forecast>Condition>Dust/Sand Whirls; Current>Condition>Dust Storm; Forecast>Condition>Dust Storm; Current>Condition>Sand Storm; Forecast>Condition>Sand Storm; Current>Condition>Haze; and Forecast>Condition>Haze.

Collecting information related to events at a certain location can include collecting current, anticipated, and planned activities and events happening at a certain location. Such information can include, but is not limited to, current or anticipated traffic patterns at a given location, whether or not an event (e.g., a road race, a concert, parade, etc.) is going to occur at a location, and the like. Event information can cover as many possible happenings that can be tied to a location.

The data indexing application 256 can be configured to collect census and economic information related to a location (step 1330). In an aspect, the information can be obtained through Census and community survey data. For example, for data collected in the United States, the information can come from the US Census and US American Community Survey. In an aspect, the census and economic data can include, but is not limited to, the following attribute associated with a location: Zip Code; City; State; County; Area Code; City Type; City Alias Abbreviation; City Alias Name; Latitude; Longitude; Time Zone; Elevation; State FIPS; County FIPS; Daylight Savings; Classification Code; Multi County Flag; City Alias Code; State ANSI Code; County ANSI Code; Facility Code; City Delivery Indicator; Carrier Route Sortation; Finance Number; Population; Households; Ethnicity and racial Demographics; Male Population; Female Population; Persons/House; Median Average House Value; Median Income Per Household; MSA Code & Name; PMSA Code & Name; CSA Code & Name; CBSA (Core Based Statistical Area) Code & Name; CBSA Type; CBSA Division Code & Name; Region; Division; Mailing Name; Median Age; Male Median Age; Female Median Age; Number of Businesses; Q1 Payroll; Annual Payroll; Number of Employees; Employment Flag; County Growth Rank; Housing Units; Number Increase in Units; Percentage Increase in Units; CBSA Population; CBSA Division Population; 113th Congressional District; 113th Congressional Land Area; Number of Residential Mailboxes; Number of Business Mailboxes; Total Delivery Receptacles; Current Population; Multi County Data; and Land & Water Area. In an aspect, the information can be collected at the most granular level (block level), or can be collected at higher levels, such as zip code, city, or other known geographical defining areas.

While the collection of attribute related data (step 1100) discussed above provides an order to the collection of attributes, the method does not have to be performed in such an order. In some aspects, the data indexing application 256 may not collect information for the user agent attributes.

Figure 10:
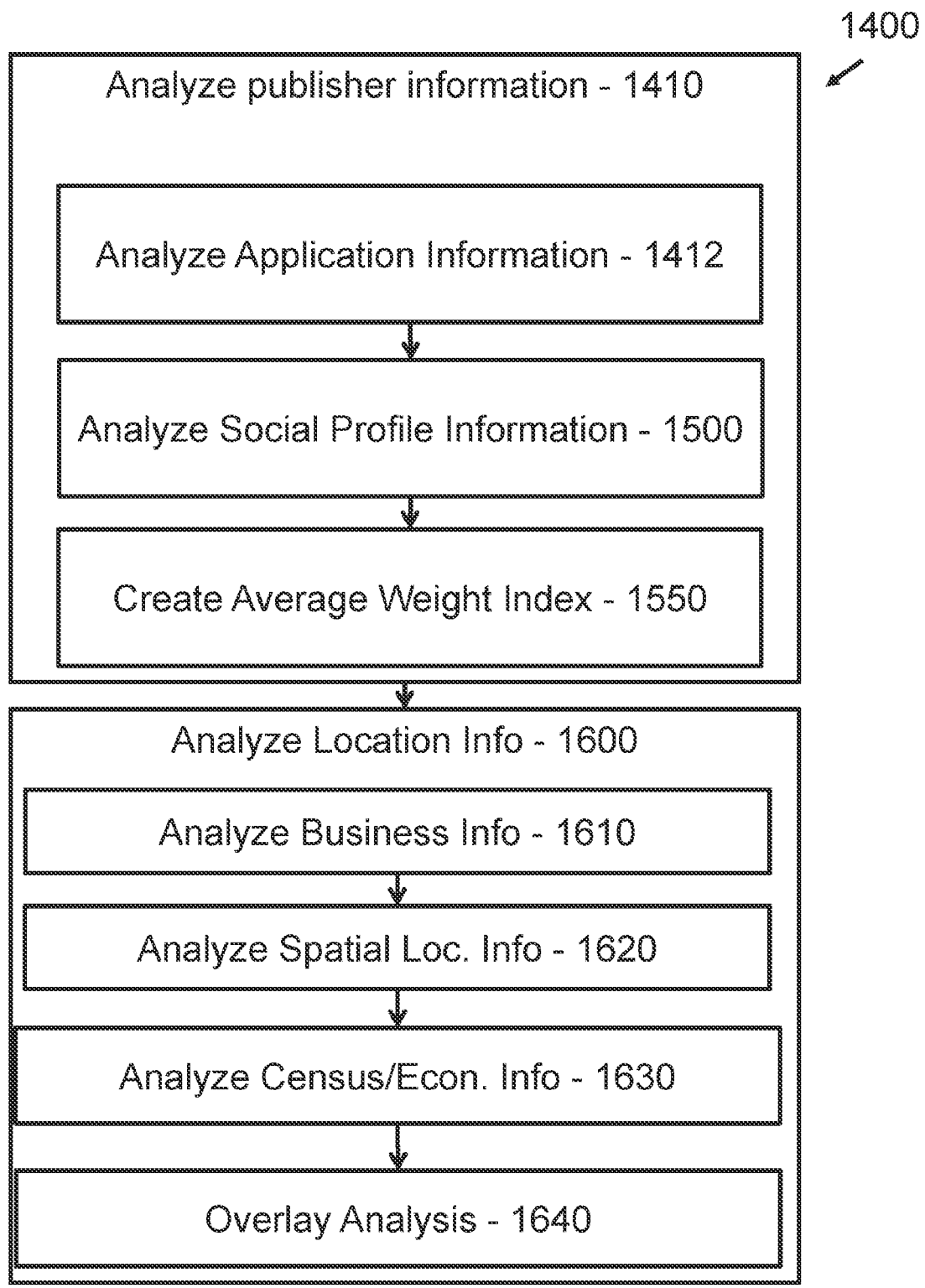

Once the attribute related data has been collected (step 1100), the data indexing application 256 is configured to analyze and index the collected attribute data (step 1400). In an aspect, the data indexing application 256 is configured to analyze the publisher information (step 1410), analyze the location information (1600), and analyze the census/economic information (1630), as illustrated in FIG. 10.

Figure 11:
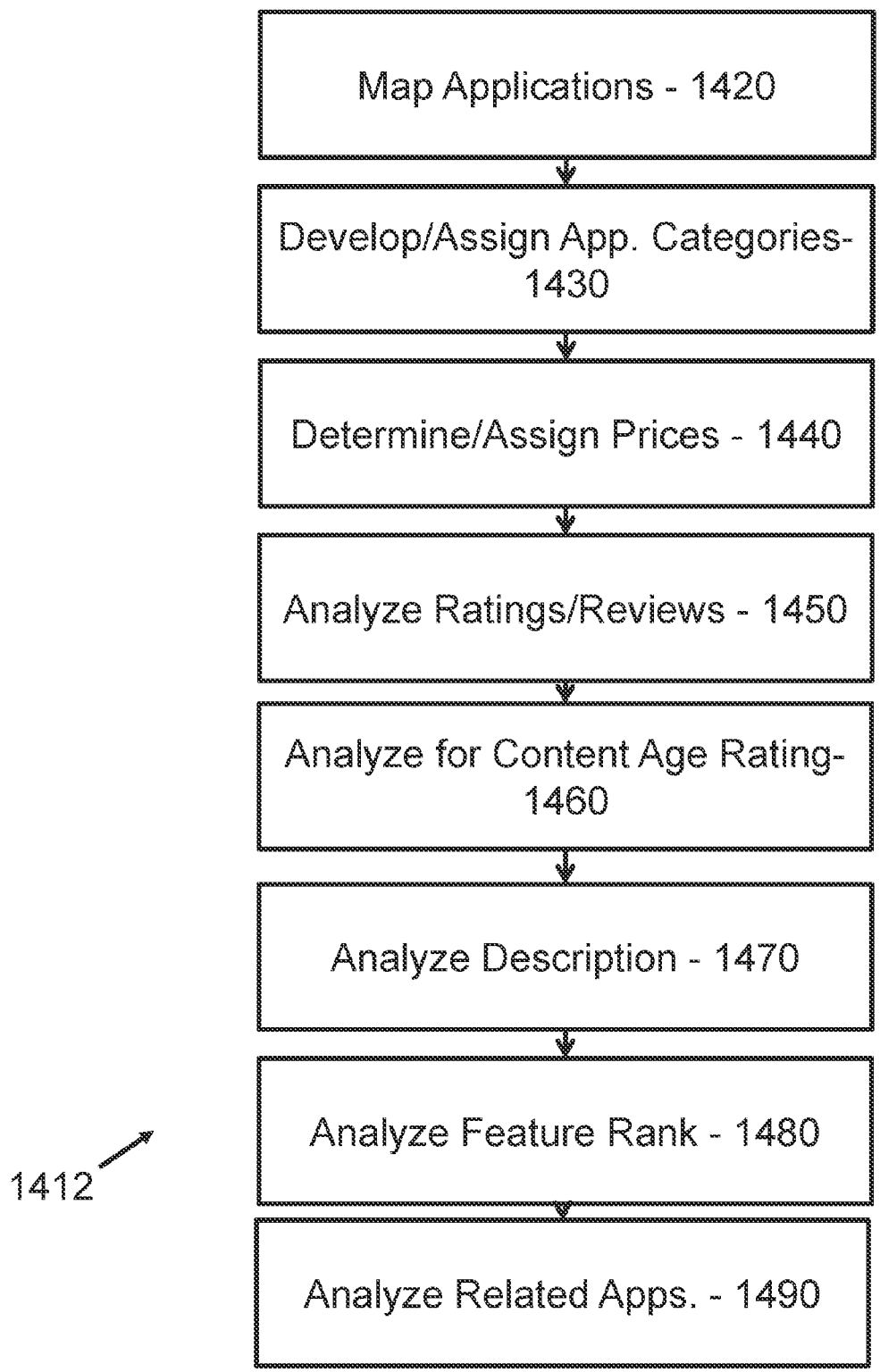

In an aspect, the analysis of the publisher information (step 1410) includes analysis of application information (1412) analysis of social profile information (step 1500), and creating an average weighted index (step 1550). In an aspect, the analysis of application information (step 1412), illustrated in FIG. 11, includes, but is not limited to, mapping applications (step 1420); developing and assign/map application categories (step 1430); determining price of applications (step 1440); analyzing application store ratings and number of reviews (step 1450); analysis for content age rating (step 1460); analysis of application description (step 1470); analysis of featured rank (step 1480); and analysis of related applications (step 1490).

In an aspect, the mapping of applications (step 1420) is done to identify and match the applications that occur between multiple application stores. The mapping of applications includes comparing the name of the application, including text variations, and the name listed as the registered developer. In addition, the data indexing application 256 can be configured to compare the website, support links, and the social media profiles associated with the applications. This can be particularly helpful when an application has been available on one platform (e.g., iOS) for a while, and has just been released on another platform (e.g., Android).

The applications can be mapped into categories as well (step 1430). The applications are mapped to categories that extend across the multiple applications stores. By unifying the mapping of various applications, their categories, and the subcategories, it becomes easier to identify related applications. In an exemplary aspect, the applications are mapped to categories according to IAB standards. In an aspect, the categories can be based upon those categories used on the application stores, or can be created to better identify the applications.

The applications can also have their pricing history determined (step 1440). Determining if the application has been offered for a price or for free over the history of the application provides insights into the application as well. In addition, the process allows for the tracking of the change of prices over time. In an aspect, applications can be segmented by price ranges to target different types of audiences.

The data indexing application 256 can further analyze application store ratings and number of reviews (step 1450). The analysis of the store ratings and number of reviews can be used to develop an application quality score/index. Such an index assists marketers better understand the quality of inventory in a given application. In an aspect, the application quality score can be configured to analyze over time the current state and historical changes for the number of installations of the mobile application, the release date of the application, and the date of the last application update from the developer.

In an aspect, the data indexing application 256 can be further configured to content age rating (step 1460). In such a step, the applications can be mapped to certain age ranges based upon the categories provided by the application stores and an analysis of applications themselves. For example, the data indexing application 256 can review the descriptions and reviews to see the content related to the applications. Creating an age rating can be utilized to help identify the typical end user of the application. In addition, the content age rating can be utilized for brand safety reasons, and to keep content of certain advertisements from reaching unintended end users.

The data indexing application 256 can analyze the application description (step 1470). In an aspect, the description can be keyword density analyzed to i) establish links between related applications, ii) discover additional applications, and iii) clustering applications based on commonalities. The keyword analysis can be used in Brand safety as well.

The featured rank of the applications can be analyzed (step 1480). In an aspect, the application store ranking and how individual applications may be featured in various sub sections of their respective application stores can be analyzed for quality and other attributes.

Lastly, the data indexing application 256 can also analyze the applications in order to find related applications (step 1490). In an aspect, the related applications can be mapped to one another based upon found commonalities. For example, the applications can be mapped to one another based upon finding similar reviewers, categories, developer, curated feature categories, and historical ranking data. In an aspect, the structured related applications per application store, which are displayed on each individual application promotional page, can be utilized as well. Based upon this analysis or related applications, a supposed "web" of applications can be created, with multiple levels of relationships.

Figure 12:
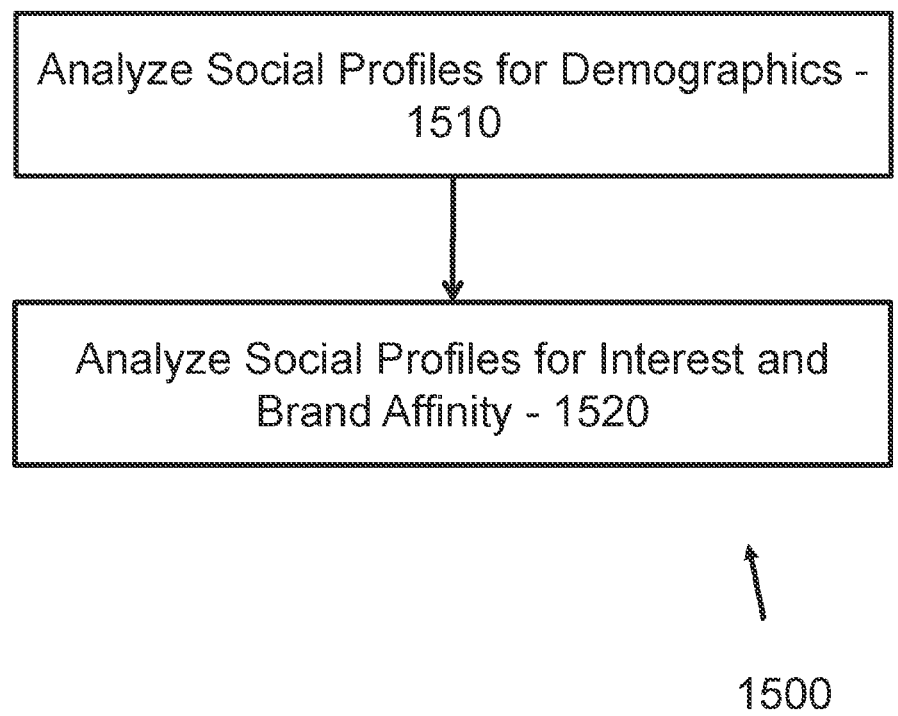

FIG. 12 illustrates the analysis of social profile information (step 1500), according to an aspect. As shown, the data indexing application 256 can analyze the social profiles for demographics (step 1510) and interest and brand affinity (step 1520). In an aspect, the social profile information is provided to the data enrichment server 40 from third party servers 45. The analysis of the social profiles can be used to determine the most likely demographics of the users of applications (step 1510). Such demographics can include, but are not limited to, sex, sexual preference, ethnicity, age, and the like. For example, first names can be analyzed to determine the gender of the user.

The social profiles can be analyzed to determine an understanding of interests and affinity to brands (step 1520). In an aspect, the data enrichment server 40 can call upon a third party server 45 to provide the analysis. The returned analysis can be used to create an index representation to highlight which profiles are more or less likely to be interested in or affiliated with an activity or brand.

Once the analysis has been completed above, the results from steps 1420 through 1520 can be aggregated to an application, developer, and a category level to highlight the likelihood that a given application's users, developer's users, or all users with applications within a given category are to be which gender, ethnicity, and have a specific interest or affiliation with a brand (step 1550). In an aspect, all attributes are expressed as an average weighted index.

The data indexing application 256 can be further configured to analyze location information (step 1600). The analysis of the location information can include analyzing the businesses information (step 1610), analyze spatial location information (step 1620), analyze census data (step 1630), and then overlaying the analyzed information (step 1640), as shown in FIG. 10.

Returning to the business information (step 1610), the business names can be associated with a business type. The association can be based upon the information collected for the various businesses, which can vary and come from numerous sources, as discussed above. Once the business has been associated with a business type, the businesses can then be mapped to common categories. The mapping to common categories assists the marketers in identifying the potential advertisement that can be used.

In addition, the analyzing location information can include analyzing spatial information of the locations (step 1620). For example, as discussed above, the current weather, forecasted weather, and events can be associated with a location. These events can then be mapped to a given location or area. In an aspect, the location can be identified as a work place, travel place, food place, or the like, to indicate the situation the end user is in when the advertisement opportunity has been presented. For example, if the end user accesses WiFi provided by a known clothing retailer, it can be determined that the end user is currently clothes shopping. In another example, the WiFi access point can be identified with a private business, which can indicate that the end user is currently at work.

After analyzing the spatial information, the census and economic data can be analyzed (step 1630). The data indexing application 256 can create an average weighted index based on the census and economic data. In an aspect, the weighted index can be based on census zip codes, cities, or regions. In an aspect, the analysis of the census and economic information can have already been determined by a third party vendor 45.

After all of the business, spatial information, and economic data has been analyzed, weighted, and mapped (steps 1610 to 1630), the information can then be overlaid with one another (step 1640). For example, all of the categorized business information is then overlaid with the census data and the spatial information. This builds an average weighted index for each region based upon the categories discussed above.

Once the data indexing application 256 has carried out the data collection and analysis (steps 1100 and 1400 respectively), the data enrichment server 40 can call upon the data enrichment application 258 to enrich a received request by appending the indexed data (step 1700). The request can include, but is not limited to, bid requests, add requests, and other forms of request known in marketing.

In an aspect, the request is generated by a publisher server 30 when an advertising opportunity has been presented by the internet enabled device 20. In an aspect, the request includes an application identifier, the location of the internet enabled device 20, and the user agent of the device 20.

In an aspect, the application identifier can identify the specific application that is presenting the advertisement opportunity. In another aspect, the application identifier can include the identification of a url instead of the application identifier. In other aspects, the application identifier can include both the urd called upon by the application as well as the application identifier presenting the opportunity. The user agent information can be included in the request as well. The user agent information can include, but is not limited to, the type of device, operating system, and browser type.

In an aspect, the location of the internet enabled device 20 can include passing along the GPS coordinates (i.e., the latitude and longitude) of the device 20. In other aspects, GPS may not be available, and therefore an IP address can be included in the location information of the internet enabled device 20. In other aspect, both the GPS coordinates and the IP address can be passed along.

Upon receiving the request, the data enrichment application 258 can then append the indexed data to the request. When an application identifier is received, the average weighted index of the application information can be added. The information can include, but is not limited to, related applications, application categories, pricing information, application quality score, brand safety rating, keywords, featured ranks, and the like. In addition, appended information can be added based upon the user agent attributes passed along. However, it is preferable to use the application indexed information if possible.

If GPS coordinates are present, the overlaid location information can be appended. In an aspect, points of interest can be presented, and can be further categorized as points of interest that are (i) at; (ii) near; and (iii) in range based upon the distance of the internet enabled device 20 to the identified points of interests. In addition, the longitude and latitude allow the joining of the zip code based census/economic information. The spatial location information (weather and events) can be added as well. If the IP address is available, additional spatial information regarding the activity of the end user of the internet enabled device can be appended.

If the GPS coordinates are not available, the provided IP address can be used. In an aspect, the data enrichment application 258 can determine whether the IP address is a carrier or WiFi IP. If the IP address is a WiFi IP, the location of the WiFi can be determined (e.g., it can be acquired from a third party server 45), which can then be matched to a city or zip code region. Once the region has been identified, the census information can be appended. Further, the spatial location information can be appended based upon the identification of the region as well.

The data enrichment application 258 can append data based upon the information presented in the request. For example, if the location of the internet enabled device 20 is presented without an application identifier, the request can be appended with location based information (e.g., the points of interest and the spatial location information). Indexed information based upon the user agent information can be appended. Likewise, if a request includes the application identifier and no way of identifying the location of the user, the request is appended with the application index. Once appended, the request can be sent along to the marketers 50. Below is an example of a bid request.

```
***Example Enriched Bid Request:
{
  "censusdata": {
     "medianAge": 42.6,
     "city": "PINCKNEY",
     "timezone": "5",
     "county": "LIVINGSTON",
     "region": "Midwest",
     "division": "East North Central",
     "zipcode": "48169",
     "income": "Mid",
     "state": "MI",
     "averageHouseholdIncome": 72901,
     "population": 20813
  },
  "appdata": {
     "price": "Free",
     "contentRating": "Everyone",
     "category": "Cards & Casino",
     "reviewRating": 4.2,
     "developer": "Ahoy Games",
     "releaseDate": "2/26/2014",
     "title": "Okey",
     "brandSafety": "PG",
     "relatedApps": "Gin Rummy;Gin Rummy Free;BlackJack 21 FREE;Solitaire;Zynga
      Poker - Texas Holdem;Live Holdem Poker Pro;Solitaire;DH Texas Poker,Rummi
      Plus;UNO ™ & Friends,Coin Dozer;Aces Gin Rummy;Okey;Okey
      Canak;Okeyoid;Rummy;Okey Mini;Okey Hane;101 Online;Batak Online;okey
      online;G4A: Indian Rummy,Okey Plus; 101 Yüzbir Okey Plus",
     "ethnicity": "Caucasian",
     "gender": "male",
     "keywords": "game,tiles,tile,için,çok,set,played,board,player,high"
  },
  "ipintelligence": [
     {
        "isp": "DoD Network Information Center",
        "organization": "DoD Network Information Center"
     }
  ],
  "placedata": [
```

-continued

```
{
  "city": "WIXOM",
  "businessName": "Paladin Heavy Construction dealer",
  "category": "",
  "distance": 0.32,
  "range": "Near"
},
{
  "city": "Wixom",
  "businessName": "Fastenal",
  "category":
  "distance": 0.34,
  "range": "Near"
},
{
  "city": "PINCKNEY",
  "businessName": "CheckFreePay",
  "category": "Financial",
  "distance": 0.36,
  "range": "Near"
},
{
  "city": "Wixom",
  "businessName": "CrossFit",
  "category": "Health And Fitness",
  "distance": 0.38,
  "range": "Near"
},
{
  "city": "Wixom",
  "businessName": "Bayco",
  "category": "",
  "distance": 0.4,
  "range": "Near"
}
],
"device": {
  "os": "Android",
  "brand": "Samsung",
  "screenWidth": 720,
  "isTablet": true,
  "model": "Galaxy Note II",
  "osVersion": "4.4",
  "screenHeight": 1280
},
"weather_current": {
  "temp": 57,
  "tempMin": 55,
  "condition": "Clouds",
  "tempMax": 59
},
"weather forecast": [
  {
    "tempMin": 48,
    "condition": "Clear",
    "tempMax": 60
  }
]
}
```

The marketer servers 50 can then make a determination as to whether or not to respond to a request, as well as how to respond, based upon the enriched request. For example, the marketer servers 50 can call upon the request response application 308 to make the determination. The request response application 308 can be configured to have preconceived constructs and business rules that analyze the information provided in the request. If the appended data matches the constructs, a response can be generated, including the type of response required.

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A method for providing enriched requests for advertising opportunities to marketers, wherein advertisements reach at least one of a plurality of mobile internet enabled devices, the method comprising:

receiving a request for advertising content from at least one of a plurality of publisher servers, wherein the request for advertising content is generated in response to an advertising opportunity on the at least one of the plurality of mobile internet enabled devices;

using a data enrichment server to analyze and index attribute data associated with the at least one of the plurality of mobile internet enabled devices, the attribute data comprising information relative to a plurality of publisher attributes and including data points associated with a plurality of mobile applications;

mapping the plurality of mobile applications to identify and match mobile applications occurring between multiple application stores;

appending the attribute data to the request for advertising content; and presenting the request for advertisement content with the appended attribute data to at least one marketer server.

2. The method of claim 1, wherein the request for advertising content comprises:

an application identifier that identifies software applications associated with the at least one of the plurality of mobile internet enabled devices;

a location identifier that provides location information associated with the at least one of the plurality of mobile internet enabled devices; and an user identifier that provides user information associated with the at least one of the plurality of mobile internet enabled devices.

3. The method of claim 1, wherein data sets in the attribute data are compiled from information provided by the at least one of the plurality of publisher servers, the at least one of the plurality of mobile internet enabled devices and at least one of a plurality of third-party data servers.

4. The method of claim 1, wherein the attribute data comprises information relative to:

demographics associated with an end-user of the at least one of the plurality of mobile internet enabled devices;

a location of at least one of the plurality of mobile internet enabled devices;

a spatial orientation of at least one of the plurality of mobile internet enabled devices; and a point of interest associated with the at least one of the plurality of mobile internet enabled devices.

5. The method of claim 1, wherein the data points associated with the at least one of the plurality of mobile applications comprises one or more of:

a name of the at least one of the plurality of mobile applications;

categorical or classification information associated with the at least one of the plurality of mobile applications;

design and development details associated with the at least one of the plurality of mobile applications;

reviews and ratings details associated with the at least one of the plurality of mobile applications;

commercial details associated with the at least one of the plurality of mobile applications;

parental control related details associated with the at least one of the plurality of mobile applications; and installation and release details associated with the at least one of the plurality of mobile applications.

6. The method of claim 1, wherein the data points associated with the at least one of the plurality of mobile applications includes social profile data associated with at least one social media platform.

7. A data enrichment system configured to provide enriched requests for advertising opportunities, the system comprising:

a network in communication with at least one of a plurality of mobile internet enabled devices, and at least one of a plurality of publisher servers, wherein the at least one of the plurality of publisher servers is configured to provide advertisement content to the at least one of the plurality of internet enabled devices, the network further in communication with at least one of a plurality of marketer servers; and a data enrichment server, wherein the data enrichment server is configured to:

process a request for advertising content from the at least one publisher server, wherein the request for advertising content is generated in response to an advertising opportunity on the at least one mobile internet enabled device;

analyze and index attribute data associated with the at least one mobile internet enabled device, the attribute data comprising information relative to a plurality of publisher attributes and including data points associated with a plurality of mobile applications;

map the plurality of mobile applications to identify and match mobile applications occurring between multiple application stores;

append the attribute data to the request for advertising content; and present the request for advertisement content with the appended attribute data to at least one marketer server.

8. The data enrichment system of claim 7, wherein the data enrichment server is configured to communicate with at least one of a plurality of third-party data servers configured to provide the attribute data.

9. The system of claim 7; wherein the request for advertising content comprises:

an application identifier that identifies software applications associated with the at least one mobile internet enabled device;

a location identifier that provides location information associated with the at least one mobile internet enabled device; and a user identifier that provides user information associated with the at least one mobile internet enabled device.

10. The system of claim 7, wherein data sets in the attribute data are compiled from information provided by the at least one publisher server, the at least one mobile internet enabled device, and at least one of a plurality of third-party data servers.

11. The system of claim 7, wherein the attribute data comprises information relative to:

demographics associated with the at least one mobile internet enabled device;

a location of the at least one mobile internet enabled device;

a spatial orientation of the at least one mobile internet enabled device; and a point of interest associated with the at least one mobile internet enabled device.

12. The system of claim 7, wherein the data points associated with the at least one of the plurality of mobile applications comprises one or more of:

a name of the at least one mobile application;

categorical or classification information associated with the at least one mobile application;

design and development details associated with the at least one mobile application;

reviews and ratings details associated with the at least one mobile application;

commercial details associated with the at least one mobile application;

parental control related details associated with the at least one mobile application; and installation and release details associated with the at least one mobile application.

13. The system of claim 7, wherein the data points associated with the at least one mobile application includes social profile data associated with at least one social media platform.

14. The system of claim 7, wherein processing the request for advertising content is performed by a data enrichment application configured on the data enrichment server.

* * * * *